United States Patent
Kleiner et al.

(10) Patent No.: US 9,278,477 B2
(45) Date of Patent: *Mar. 8, 2016

(54) TUBE EXPANSION PROCESSES FOR SEMICRYSTALLINE POLYMERS TO MAXIMIZE FRACTURE TOUGHNESS

(71) Applicant: Abbott Cardiovascular Systems Inc., Santa Clara, CA (US)

(72) Inventors: Lothar W. Kleiner, Los Altos, CA (US); James P. Oberhauser, Saratoga, CA (US); Thierry Glauser, Redwood City, CA (US); David Wrolstad, Yucaipa, CA (US); Yunbing Wang, Sunnyvale, CA (US)

(73) Assignee: Abbott Cardiovascular Systems Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/480,484

(22) Filed: Sep. 8, 2014

(65) Prior Publication Data

US 2014/0374963 A1    Dec. 25, 2014

Related U.S. Application Data

(60) Continuation of application No. 13/631,061, filed on Sep. 28, 2012, now Pat. No. 8,828,305, which is a division of application No. 13/192,315, filed on Jul. 27, 2011, now Pat. No. 8,303,296, which is a continuation of application No. 12/424,484, filed on Apr. 15, 2009, now Pat. No. 8,012,402.

(60) Provisional application No. 61/086,100, filed on Aug. 4, 2006, provisional application No. 61/095,617, filed on Sep. 9, 2008.

(51) Int. Cl.
*B29C 61/04* (2006.01)
*B29C 71/00* (2006.01)
*B29C 35/04* (2006.01)
*B29C 71/02* (2006.01)
*B29C 35/08* (2006.01)
*B29K 67/00* (2006.01)
*B29K 105/00* (2006.01)
*B29L 31/00* (2006.01)

(52) U.S. Cl.
CPC ............ *B29C 61/04* (2013.01); *B29C 35/0805* (2013.01); *B29C 71/0063* (2013.01); *B29C 35/045* (2013.01); *B29C 71/02* (2013.01); *B29C 2035/0822* (2013.01); *B29C 2071/022* (2013.01); *B29K 2067/046* (2013.01); *B29K 2105/258* (2013.01); *B29K 2995/004* (2013.01); *B29K 2995/006* (2013.01); *B29K 2995/0089* (2013.01); *B29L 2031/7534* (2013.01)

(58) Field of Classification Search
None
See application file for complete search history.

(56) References Cited

U.S. PATENT DOCUMENTS

| | | | | |
|---|---|---|---|---|
| 6,607,553 B1 * | 8/2003 | Healy et al. | ................. | 623/1.11 |
| 8,828,305 B2 * | 9/2014 | Kleiner et al. | ................. | 264/458 |
| 2002/0125617 A1 * | 9/2002 | Skinner | ............. | A61M 25/1002 264/535 |
| 2006/0076708 A1 * | 4/2006 | Huang et al. | ................. | 264/239 |

* cited by examiner

*Primary Examiner* — Monica Huson
(74) *Attorney, Agent, or Firm* — Squire Patton Boggs (US) LLP

(57) ABSTRACT

Methods for fabricating a polymeric stent with improved fracture toughness including radial expansion of a polymer tube and fabricating a stent from the expanded tube are disclosed. The polymer tube is disposed within a mold and may be heated with radiation. The heated tube radially expands within the mold.

6 Claims, 17 Drawing Sheets

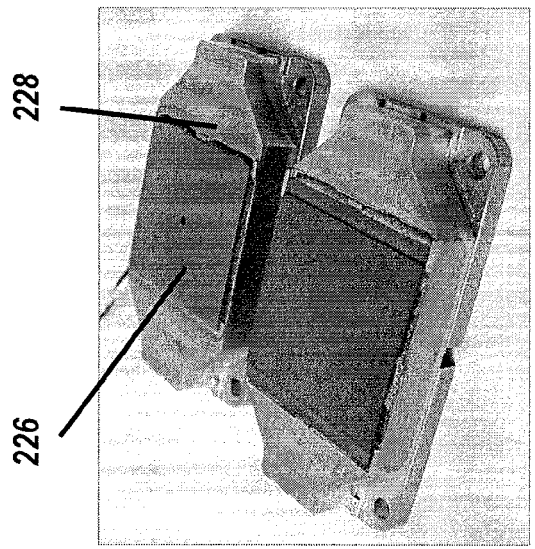
FIG. 5C
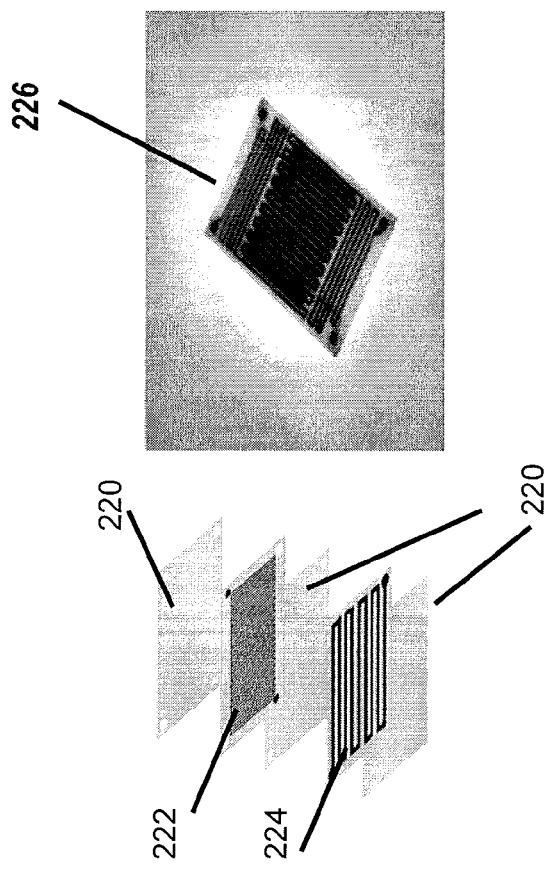
FIG. 5B
FIG. 5A

TUBE EXPANSION PROCESSES FOR SEMICRYSTALLINE POLYMERS TO MAXIMIZE FRACTURE TOUGHNESS

CROSS REFERENCE TO RELATED APPLICATION

This application is a continuation of application Ser. No. 13/631,061 filed Sep. 28, 2012, now U.S. Pat. No. 8,828,305, which is incorporated by reference herein, which is a divisional of application Ser. No. 13/192,315, now, U.S. Pat. No. 8,303,296, which is incorporated by reference herein, which was filed on Jul. 27, 2011, which is a continuation of application Ser. No. 12/424,484, now U.S. Pat. No. 8,012,402, which is incorporated by reference herein, which claims benefit of U.S. Patent Application No. 61/086,100, which was filed on Aug. 4, 2008 and claims benefit of U.S. Patent Application No. 61/095,617, which was filed on Sep. 9, 2008, which is incorporated by reference herein.

BACKGROUND OF THE INVENTION

1. Field of the Invention

This invention relates to methods of manufacturing polymeric medical devices, in particular, stents.

2. Description of the State of the Art

This invention relates to radially expandable endoprostheses, that are adapted to be implanted in a bodily lumen. An "endoprosthesis" corresponds to an artificial device that is placed inside the body. A "lumen" refers to a cavity of a tubular organ such as a blood vessel. A stent is an example of such an endoprosthesis. Stents are generally cylindrically shaped devices that function to hold open and sometimes expand a segment of a blood vessel or other anatomical lumen such as urinary tracts and bile ducts. Stents are often used in the treatment of atherosclerotic stenosis in blood vessels. "Stenosis" refers to a narrowing or constriction of a bodily passage or orifice. In such treatments, stents reinforce body vessels and prevent restenosis following angioplasty in the vascular system. "Restenosis" refers to the reoccurrence of stenosis in a blood vessel or heart valve after it has been treated (as by balloon angioplasty, stenting, or valvuloplasty) with apparent success.

Stents are typically composed of scaffolding that includes a pattern or network of interconnecting structural elements or struts, formed from wires, tubes, or sheets of material rolled into a cylindrical shape. This scaffolding gets its name because it physically holds open and, if desired, expands the wall of the passageway. Typically, stents are capable of being compressed or crimped onto a catheter so that they can be delivered to and deployed at a treatment site.

Delivery includes inserting the stent through small lumens using a catheter and transporting it to the treatment site. Deployment includes expanding the stent to a larger diameter once it is at the desired location. Mechanical intervention with stents has reduced the rate of restenosis as compared to balloon angioplasty. Yet, restenosis remains a significant problem. When restenosis does occur in the stented segment, its treatment can be challenging, as clinical options are more limited than for those lesions that were treated solely with a balloon.

Stents are used not only for mechanical intervention but also as vehicles for providing biological therapy. Biological therapy uses medicated stents to locally administer a therapeutic substance. Effective concentrations at the treated site require systemic drug administration which often produces adverse or even toxic side effects. Local delivery is a preferred treatment method because it administers smaller total medication levels than systemic methods, but concentrates the drug at a specific site. Local delivery thus produces fewer side effects and achieves better results.

A medicated stent may be fabricated by coating the surface of either a metallic or polymeric scaffolding with a polymeric carrier that includes an active or bioactive agent or drug. Polymeric scaffolding may also serve as a carrier of an active agent or drug.

The stent must be able to satisfy a number of mechanical requirements. The stent must be capable of withstanding the structural loads, namely radial compressive forces, imposed on the stent as it supports the walls of a vessel. Therefore, a stent must possess adequate radial strength. Radial strength describes the external pressure that a stent is able to withstand without incurring clinically significant damage. Additionally, a stent should be sufficiently rigid to adequately maintain its size and shape throughout its service life despite the various forces that may come to bear on it, including the cyclic loading induced by the beating heart. For example, a radially directed force may tend to cause a stent to recoil inward. Furthermore, the stent should possess sufficient toughness or resistance to fracture from stress arising from crimping, expansion, and cyclic loading.

Some treatments with implantable medical devices require the presence of the device only for a limited period of time. Once treatment is complete, which may include structural tissue support and/or drug delivery, it may be desirable for the stent to be removed or disappear from the treatment location. One way of having a device disappear may be by fabricating the device in whole or in part from materials that erode or disintegrate through exposure to conditions within the body. Thus, erodible portions of the device can disappear or substantially disappear from the implant region after the treatment regimen is completed. After the process of disintegration has been completed, no portion of the device, or an erodible portion of the device will remain. In some embodiments, very negligible traces or residue may be left behind. Stents fabricated from biodegradable, bioabsorbable, and/or bioerodable materials such as bioabsorbable polymers can be designed to completely erode only after the clinical need for them has ended.

However, there are potential shortcomings in the use of polymers as a material for implantable medical devices, such as in, for example, slide and lock stents. There is a need for manufacturing processes or material modifications for stents that addresses such shortcomings so that a polymeric stent can better meet the clinical and mechanical requirements of a stent.

SUMMARY OF THE INVENTION

Embodiments of the present invention include a method of making a stent comprising: disposing a polymer tube within a cylindrical mold having a larger diameter than the tube, wherein a radiation source is positioned along the mold axis; heating the tube with radiation from the radiation source, wherein the heated tube radially expands against an inner surface of the mold; and making a stent from the radially expanded tube.

Embodiments of the present invention include a method of making a stent comprising: disposing a polymer tube within a cylindrical cavity of a mold having a larger diameter than the tube, wherein the mold is coupled to a motion system and the mold is positioned between a heating medium and a cooling medium; translating the mold with the motion system to a position adjacent to the heating medium to heat the mold and the tube; radially expanding the tube; translating the mold with the motion system after the radial expansion to a position adjacent to or in contact with the cooling medium to cool the mold and the radially expanded tube; and making a stent from the radially expanded and cooled tube.

BRIEF DESCRIPTION OF THE DRAWINGS

FIG. 5A depicts the components of an aluminum nitride heater.

FIG. 5B depicts an aluminum nitride heater.

FIG. 5C depicts an aluminum nitride heater attached to a heat sink block.

DETAILED DESCRIPTION OF THE INVENTION

Various embodiments of the present invention relate to manufacture of polymeric implantable medical devices, such as stents. In particular, embodiments include methods of expanding a polymer tube and fabricating a stent therefrom. The methods described herein are generally applicable to any tubular polymeric implantable medical device. In particular, the methods can be applied to tubular implantable medical devices such as self-expandable stents, balloon-expandable stents, and stent-grafts.

Figure 1:
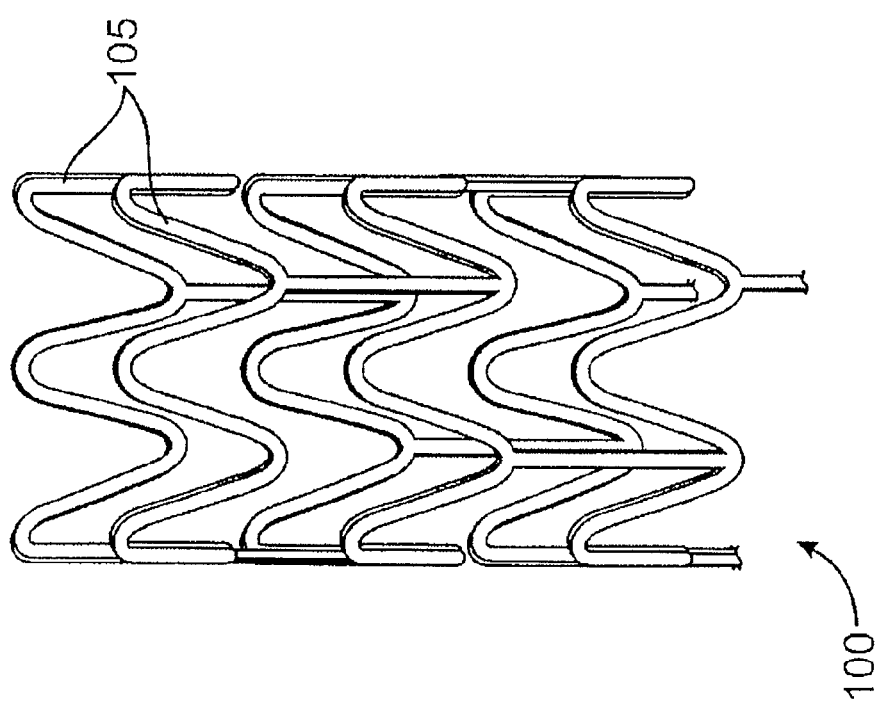
FIG. 1 depicts a stent.

A stent may include a pattern or network of interconnecting structural elements or struts. FIG. 1 depicts a view of a stent 100. In some embodiments, a stent may include a body, backbone, or scaffolding having a pattern or network of interconnecting structural elements 105. Stent 100 may be formed from a tube (not shown). The structural pattern of the device can be of virtually any design. The embodiments disclosed herein are not limited to stents or to the stent pattern illustrated in FIG. 1. The embodiments are easily applicable to other patterns and other devices. The variations in the structure of patterns are virtually unlimited. A stent such as stent 100 may be fabricated from a tube by forming a pattern with a technique such as laser cutting or chemical etching.

A stent such as stent 100 may be fabricated from a polymeric tube or a sheet by rolling and bonding the sheet to form the tube. A tube or sheet can be formed by extrusion or injection molding. A stent pattern, such as the one pictured in FIG. 1, can be formed in a tube or sheet with a technique such as laser cutting or chemical etching. The stent can then be crimped on to a balloon or catheter for delivery into a bodily lumen.

An implantable medical device can be made partially or completely from a biodegradable, bioabsorbable, or biostable polymer. A polymer for use in fabricating an implantable medical device can be biostable, bioabsorbable, biodegradable or bioerodable. Biostable refers to polymers that are not biodegradable. The terms biodegradable, bioabsorbable, and bioerodable are used interchangeably and refer to polymers that are capable of being completely degraded and/or eroded when exposed to bodily fluids such as blood and can be gradually resorbed, absorbed, and/or eliminated by the body. The processes of breaking down and absorption of the polymer can be caused by, for example, hydrolysis and metabolic processes.

A stent made from a biodegradable polymer is intended to remain in the body for a duration of time until its intended function of, for example, maintaining vascular patency and/or drug delivery is accomplished. After the process of degradation, erosion, absorption, and/or resorption has been completed, no portion of the biodegradable stent, or a biodegradable portion of the stent will remain. In some embodiments, very negligible traces or residue may be left behind.

The duration of a treatment period depends on the bodily disorder that is being treated. In treatments of coronary heart disease involving use of stents in diseased vessels, the duration can be in a range from about a few months to a few years. However, the duration is typically up to about six months, twelve months, eighteen months, or two years. In some situations, the treatment period can extend beyond two years.

As indicated above, a stent has certain mechanical requirements such as high radial strength, high modulus, and high fracture toughness. A stent that meets such requirements greatly facilitates the delivery, deployment, and treatment of a diseased vessel. A polymeric stent with inadequate mechanical properties can result in mechanical failure or recoil inward after implantation into a vessel.

With respect to radial strength, the strength to weight ratio of polymers is usually smaller than that of metals. To compensate for this, a polymeric stent can require significantly thicker struts than a metallic stent, which results in an undesirably large profile.

Additionally, polymers that are sufficiently rigid to support a lumen at conditions within the human body may also have low fracture toughness since they may exhibit a brittle fracture mechanism. For example, these include polymers that have a glass transition temperature (Tg) above human body temperature (Tbody), which is approximately 37° C. Such polymers may exhibit little or no plastic deformation prior to failure. It is important for a stent to be resistant to fracture throughout the range of use of a stent, i.e., crimping, delivery, deployment, and during a desired treatment period.

One way of addressing the strength deficiency that a polymer may have is to fabricate a stent from a deformed polymer construct. Deforming polymers tends to increase the strength and stiffness (i.e., modulus) along the direction of deformation. We have observed that deformation also tends to increase fracture toughness of polymer constructs and stents. Without being limited by theory, the increased strength and modulus are due to alignment of polymer chains or a preferred polymer chain orientation along the axis or direction of deformation.

For semicrystalline polymers, the conditions (e.g., time, temperature, stress) of polymer deformation can result in a change in the crystallinity and crystalline microstructure. The mechanical properties of a polymer depend both upon the crystallinity and crystalline microstructure. Therefore, it is important to understand the dependence of these properties on the thermal and deformation history of a polymer.

Generally, in the crystallization of polymers, there are two separate events that occur. The first event is the formation of nuclei in the polymer matrix. The second event is growth of the crystallite around these nuclei. The overall rate of crystallization of the polymer is dependent, therefore, on the equilibrium concentration of nuclei in the polymer matrix, on the exact temperature between Tg (glass transition temperature) and Tm (polymer melting temperature), its molecular weight, and on the rate of growth of crystallites around these nuclei.

Semicrystalline polymers can contain both amorphous and crystalline domains at temperatures below their melting point (Tm). Amorphous regions are those in which polymer chains are in relatively disordered configurations. Crystalline domains or crystallites are those in which polymer chains are in ordered configurations with segments of polymer chains essentially parallel to one another.

The classical view of polymer crystallization is a thermodynamically "frustrated" nucleation and growth process. The transition from a disordered state where flexible chains adopt the random coil conformation to a rigid, ordered, three-dimensional state has been formally treated as a classical first-order transition. Crystallites form at the stable nuclei and grow by reorganizing random coil chains into chain-folded crystalline lamellae (approximately, 10 nm thick). However, individual segments of polymer molecules are often unable to adopt the thermodynamically desirable conformation state necessary for crystallization before adjacent segments crystallize, locking in non-equilibrium amorphous structure. Thus, semicrystalline polymers form a mixture of ordered crystalline and disordered amorphous regions. The crystalline lamellae form sheaf-like stacks a few lamellae thick (approximately 50 to 100 nm) that splay and branch as they grow outward, forming spherulites varying from submicron to millimeters in size. The growth of an individual spherulite ceases when it impinges with neighboring spherulites. Only in the theoretical limit of infinite time at the equilibrium melting temperature could a semicrystalline polymer form the thermodynamic ideal single-crystal structure. Even at infinite time, there will be some defects in the semi-crystalline structure, such as the chain ends. So one can get close, but not 100% ideal single-crystal structure. The fastest approach to near ideal, which does not require long times, is to grow the crystal from dilute solutions.

Although the crystal structure described above is very common, the ultimate semi-crystalline structure will depend upon processing conditions. Another semi-crystalline structure is one in which the polymer is processed so that the chains are preferentially oriented in a processing direction. This structure will have no or very few spherulites and relatively few chain folds.

Hence, for all practical situations, semicrystalline polymers assume a kinetically-driven, non-equilibrium morphology in the solid state. The overall crystallization kinetics follows the general mathematical formulation that has been developed for the kinetics of phase changes with only minor modifications. The importance of nucleation processes in polymer crystallization has been amply recognized. This concept has been applied to the analysis of the kinetics of polymer crystallization.

Figure 2:
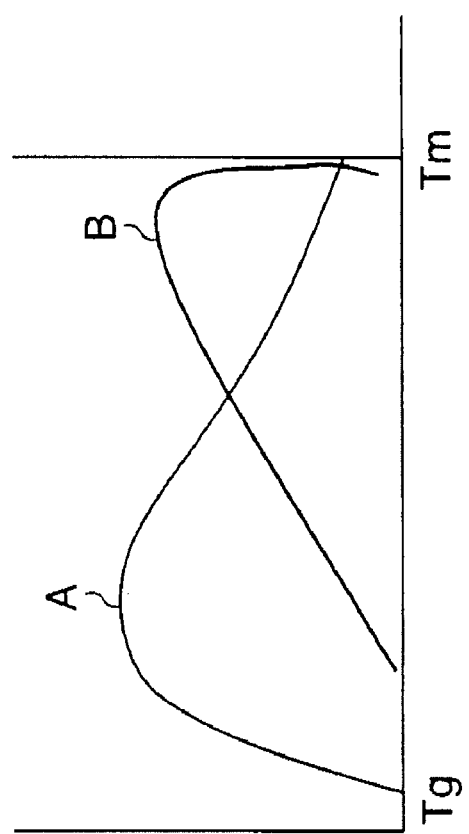
FIG. 2 depicts a schematic plot of the crystal nucleation rate and the crystal growth rate for a polymer versus temperature between the Tg and the Tm under quiescent conditions.

In general, the crystallization process occurs in a polymer at temperatures between Tg and Tm of the polymer. FIG. 2 shows a schematic of the dependence of nucleation rate (A) and crystal growth rate (B) on temperature between the Tg and the Tm under quiescent conditions, i.e., in the absence of deformation to the polymer. At temperatures above Tg but far below Tm where polymer chain mobility is limited, nucleation is substantially favored over growth, since the latter process requires much more extensive chain mobility. These nuclei remain present in the polymer until its temperature is elevated above Tm for a period of time. A consequence of the behavior illustrated in FIG. 2 is that at high temperatures below Tm there are relatively few, large crystallites formed, while at low temperatures, there are relatively more numerous, smaller crystallites formed.

Most semicrystalline polymers crystallize slowly from the quiescent state, but orders of magnitude faster when the material is subjected to deformation. These deformations are characteristic of processing above the Tg, but below the Tm. Such crystallization is referred to in physics as strain-induced (or flow-induced) crystallization. Liedauer, et al., *Int. Polym Proc.* 8, 236-244 (1993); Kumaraswamy, et al., *Macromolecules* 35, 1762-1769 (2002).

Poly (L-lactic acid) (PLLA) is but one example of the class of semicrystalline polymers for which the above description is true. When a tubular PLLA preform (e.g., extruded, dip coated, or injection molded tube) is radially expanded, axially (referring to the cylindrical axis of the tube) elongated, the material can become highly crystalline (e.g., greater than 50% as measured by differential scanning calorimetry). The polymer can concomitantly become brittle if allowed to reside above its Tg sufficiently long. Thus, these highly crystalline parts (e.g., stents) can suffer from a brittle fracture mechanism upon crimping and/or deployment.

The above discussion indicates that polymer microstructure, and thus, mechanical properties are directly related to the thermal and deformation history of a polymer. Specifically, the thermal history includes the magnitude of the temperature before, during, and after deformation of a polymer construct. The thermal history also includes the temporal temperature profile or the temperature versus time before, during and after deformation. The microstructure and mechanical properties of a polymer construct following a deformation process can vary dramatically as the thermal history is altered.

In particular, we expect the fracture toughness of a polymer to depend on the thermal and deformation history if the polymer. Fracture toughness tends to be directly proportional to crystallite density and inversely proportional to crystallite size. As a result, fracture toughness is particularly enhanced or improved when a polymer has a relatively high crystallite density with crystallites that are relatively small in size. Additionally, the degree of crystallinity and crystalline and amorphous orientation also affects the fracture toughness. As mentioned already, a crystallinity that is too high can result in an undesirable decrease in fracture toughness and brittle behavior.

Thus, since nucleation rate is faster than crystallite growth rate at lower temperature close to Tg, it is preferable for the temperature of the tube be in this range during deformation. The crystallinity obtained depends upon the magnitude of the temperature and the time that the tube is in the crystallization temperature range, i.e., between Tg and Tm.

Another important property of a polymer construct for medical device fabrication is spatial uniformity of mechanical properties of the construct. Specifically for a tube, spatial uniformity may refer to uniformity of properties along the length of the tube and around the circumference. Spatial uniformity is important generally for mechanical stability and, generally, the performance of a device. Due to the dependence of mechanical properties on thermal and deformation history in general, it follows that the spatial thermal deformation history (e.g., time and temperature history along the length of a tube) will influence the spatial uniformity of the mechanical properties. Therefore, to fabricate an expanded tube with superior fracture toughness and performance, it is of paramount importance to control its thermal and deformation history.

Embodiments of the present invention described below include deformation of a polymer tube in which the thermal and deformation history are controlled to enhance the fracture toughness of the expanded tube. Additionally, the embodiments include controlling the degree of uniformity of the thermal and deformation history to enhance uniformity of the mechanical properties of the polymer tube. Deformation can refer radial expansion and axial elongation of the tube. The radial expansion can be accomplished by a blow molding process. The embodiments further include making a stent from radially expanded tube which has superior fracture toughness and spatial uniformity of mechanical properties.

Generally, the embodiments of the fabrication method include heating a polymer tube above an ambient temperature to facilitate or allow deformation, deforming the heated tube, and cooling the deformed sheet to stabilize the changed microstructure of the polymer structure.

The changed microstructure includes crystal structure and induced polymer chain orientation. More particularly, various embodiments of the present invention include heating an axial section of a polymer tube to facilitate radial deformation of the axial section. The axial section is sufficiently long to fabricate at least one stent. The axial section can be heated from an initial temperature, for example ambient temperature (T ambient) to a target deformation temperature between Tg and Tm of the polymer. The heated axial section is radially deformed to a target diameter.

The polymer tube can be composed 100% of a homopolymer or blend of polymers or consist essentially of a copolymer or blend of polymers including copolymers. The polymer tube can be composed of a polymer or polymers with non-polymer substances, such as metallic or ceramic particles, dispersed or mixed within a polymer.

In embodiments of the invention, the radial deformation is performed to facilitate expansion along the whole length of the axial section at the same time. In these embodiments, the axial section is radially deformed along its entire length at the same time or approximately the same time.

After radial expansion, the expanded axial section is actively cooled to below a target temperature to stabilize the axial section at or close to the target diameter. The target temperature can be, for example, Tg or T ambient. Subsequent to cooling, a stent can be fabricated from the entire axial section or at least a portion of the deformed axial section.

In certain embodiments, the tube is made of a semicrystalline polymer with a Tg above Tbody. In order to facilitate stability of the stent at conditions within a human body, the Tg may be at least 10, 20, or 30° C. greater than Tbody.

As indicated, the radial expansion of the tube can be achieved through a blow molding process. Blow molding generally refers to a process in which a polymeric tube is placed in a tubular mold and deformed in the radial direction through an increase in the pressure inside the tube by blowing a gas into the tube. The increased pressure expands the tube and the mold limits the radial deformation of the polymeric tube to the inside diameter of mold. To facilitate expansion, the tube made of a semicrystalline polymer is typically heated to a temperature above Tg, but below Tm.

The control of the thermal and deformation history in a tube expansion process, such as blow molding, that provides enhanced fracture toughness and spatial uniformity includes, but is not limited to (1) rapidly heating the tube above Tg (and below Tm); (2) expanding the entire tube at one time or the same time; and (3) rapidly cooling or quenching the tube below Tg. Such control allows superior control over the material microstructure, including both crystalline and amorphous orientation states, crystalline lamellar thickness and spacing, overall degree of crystallinity ($\chi_c$), microstructural homogeneity along the tube axis, and ultimately tunable macroscopic material properties, including fracture toughness.

Figure 3A:
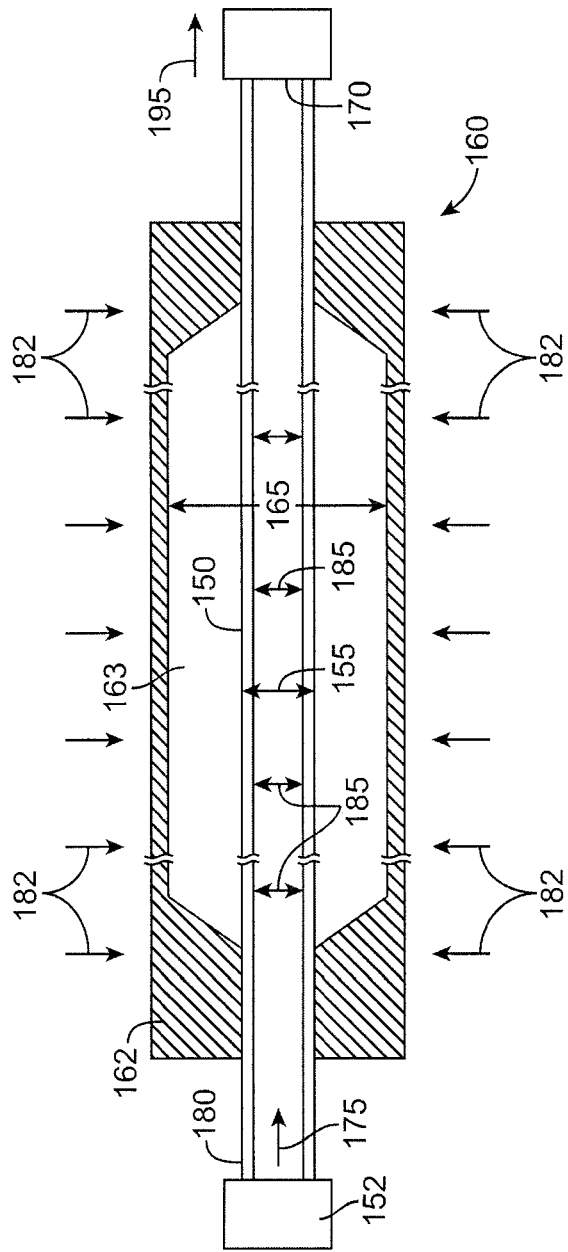
FIGS. 3A-B depict a schematic of an embodiment of the deformation or expansion process of the present invention.
Figure 3B:
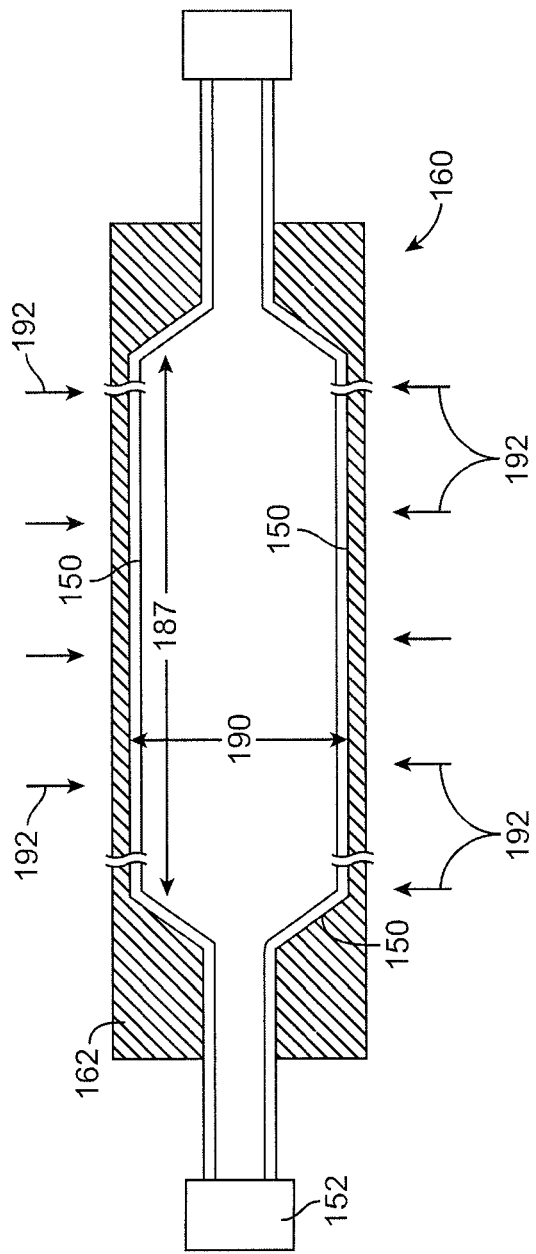

FIGS. 3A-B depict a schematic of an embodiment of the deformation or expansion process of the present invention. The expansion process is not limited to that disclosed and can be accomplished in a variety of ways, not exclusively as disclosed herein. FIG. 3A depicts an axial cross-section of a polymeric tube 150 with an outside diameter 155 positioned within a mold 160. Mold 160 has a mold body 162 with a tubular cavity 163 that is tapered at its distal and proximal ends. A chuck 152 holds at least one end of tube 150. When polymeric tube 150 expands, mold 160 limits its radial deformation to a diameter 165, the diameter of tubular cavity 163. Polymer tube 150 may be closed at a distal end 170. Distal end 170 may be open in subsequent manufacturing steps.

Prior to expansion, polymeric tube 150 is heated to increase its temperature to make the tube ductile and amenable to expansion. A temperature at which the polymeric tube is deformed or deformation temperature is between Tg and Tm of the polymer. The tube is heated to facilitate or provide a uniform temperature along the length of the tube and around the circumference of the tube. The tube can be heated in a number of ways, which are discussed in more detail below. For example, a nozzle or nozzles can heat the tube by directing a warm gas on mold 160, as shown by arrows 182, along the length of mold body 162 that includes tubular cavity 163.

When the polymeric tube is heated to a deformation temperature, the pressure is increased inside the tube to a deformation pressure to radially deform the tube. A fluid is conveyed, as indicated by an arrow 175, into proximal end 180 of polymeric tube 150 to increase the pressure inside of the tube. A tensile force 195 can be applied at distal end 170 to axially deform tube 150. Tension can also be applied at both ends.

The increase in pressure inside of polymer tube 150 facilitated by the increase in temperature of the polymeric tube causes radial deformation of an axial section of polymeric tube 150 contained within tubular cavity 163. The axial section is radially deformed along its entire length at the same time or approximately the same time, as indicated by arrows

185. FIG. 3B depicts polymeric tube 150 with an axial section 187 in a deformed state with an outside diameter 190.

In order to stabilize the deformed state, the tube is then cooled, preferably to below the Tg of the polymer. The tube is preferably cooled to obtain a uniform or relatively uniform decrease in temperature along the length and circumference of the tube. The tube can be cooled in a number of ways, which are discussed in more detail below. For example, cooled gas can be directed at mold 160 along all or most of the length of the tube, as shown by arrows 192.

There are various processing variables of the radial deformation process, in particular, the blow molding process, which may influence the fracture toughness and other properties of a deformed tube. These include the deformation temperature, the time the tube is heated until it is deformed at the deformation temperature (heating time), the time delay between the deformation of the tube (when the tube is deformed against inner surface of the mold) and the start of active cooling (cooling delay), and the duration of active cooling of the tube (active cooling time), and the time for the active cooling to cool the tube to below Tg (Tg cooling time). The time at which the tube is deformed can correspond to the time at which the tube conforms completely or substantially to the inside surface of the mold. Substantially deformed may correspond to a deformed tube with air bubbles between the tube wall and the mold. In a typical embodiment, the active cooling time may be higher than the Tg cooling time.

"Active cooling" refers to cooling the tube through exposure of the tube and/or mold to conditions below ambient temperature that results in a decrease in temperature of the tube. Passive cooling includes allowing the tube to cool only through the exposure of the tube and mold to ambient conditions. During the cooling delay, the tube may be cooled passively or experience a decrease in temperature through exposure of the mold and tube to ambient temperature or above ambient temperature. Alternatively, heating of the mold and tube may continue during some or all of the cooling delay.

The fracture toughness of a deformed tube is believed to be dependent upon the parameters of deformation temperature, heating time, cooling delay, Tg cooling time, and the active cooling time. The parameters may be adjusted to obtain a desired or optimum fracture toughness, modulus, and radial strength of the deformed tube. In some embodiments, values of the parameters that achieve a high fracture toughness may be determined by measuring and evaluating properties related to fracture toughness for various values of the parameters. For example, the elongation at break of tube specimens or the number of cracks in a stent made from the tube after deployment can be measured for various values of the parameters.

The deformation temperature refers to the temperature of the tube when it is radially deformed. A higher fracture toughness for a semicrystalline polymer may be achieved by a relatively low deformation temperature, for example, a temperature that is above and close to Tg. In exemplary embodiments, a deformation temperature can be 2° C., 2-5° C., 5-10° C., 5-45° C., or greater than 45° C. above a Tg of the polymer of the tube. For example, the deformation temperature can be 5-10° C., 5-30° C., or 5-45° C. above a Tg of a polymer of the tube.

In addition to being near and above Tg, actual preferred temperatures that yield desirable properties (e.g., high strength, high modulus, and/or high fracture toughness) will depend upon extruded tube wall thickness and molecular weight. For example, for PLLA, temperature ranges between 70 and 110° C. have yielded useful and desirable properties. Temperatures between 79 and 93° C. are particularly preferred for the extruded tubes with the particular grade of PLLA used by the inventors. In addition, in some embodiments, a higher fracture toughness may be achieved by a rapid heating time, short cooling delay, and fast Tg cooling time.

In a blow molding apparatus, the temperature of the mold can be measured by a temperature sensor disposed in the mold wall or on the inside or outside surface of the mold. It is expected that a temperature differential can exist between the measured temperature and the tube temperature. Such differential may be less than 0.5, 1, 2, or greater than 2° C.

As indicated above, a relatively rapid heating time facilitates a high fracture toughness. It is believed that the rapid heating time reduces the amount of time the tube temperature is in a crystallization range in which nucleation and growth occurs. It also creates crystalline and amorphous orientation that has no time to relax as it would if heating is too slow. The relaxation refers only to the amorphous orientation and in addition, the subsequent cooling below Tg must also not be too slow. If the heating is too slow, the increase in crystallinity from the heating coupled with the strain-induced crystallization from the deformation can result in a tube that is brittle with low fracture toughness.

Typically, the polymer tube is heated from Tambient. In exemplary embodiments, a PLLA polymer sheet is heated from Tambient to a deformation temperature in less than 5 s, between 5-10 s, between 10-20 s, between 20-35 s, 35-50 s, or greater than 50 s.

In certain embodiments, the cooling delay is reduced or minimized to reduce or eliminate a further increase crystallinity after deformation and to stabilize or freeze the induced polymer chain orientation. In some embodiments, the cooling of the deformed tube starts immediately or slightly after (less than 1 sec) the tube has completed deformation. In other embodiments, a cooling delay is selected to allow a further increase in crystallinity that improves mechanical properties. Also, a cooling delay help may relieve internal stress in the polymer which results in dimensional instability (i.e., a distortion in tubular shape). A cooling delay may also provide time for air pockets or bubbles between the outer surface of tube and inner surface of the mold to dissipate or disappear. An exemplary cooling delay may be less than 2 s, 5 s, 10 s, or greater than 10 s.

In some embodiments, the cooling delay may be controlled by a tension sensor that senses the tension in the tube radially or axially. In this embodiment, the cooling may be activated when a desired tension is achieved.

Additionally, achieving a high fracture toughness may be facilitated by rapid cooling from the deformation temperature to a temperature below the Tg of the polymer. A rapid cooling time minimizes an additional increase in crystallinity that can occur while the tube is above the Tg of the polymer. In such embodiments, the deformed tube is actively cooled. Various ways of active cooling are described below. Exemplary cooling times to cool a deformed tube from the deformation temperature to a Tg or Tambient are less than 0.5 sec, 1 sec, 5 sec, or greater than 10 s.

The active cooling time is selected to be sufficient to reduce the deformed tube temperature below the polymer Tg, i.e., the Tg cooling time. Exemplary, Tg cooling times can be less than 2 s, 2-5 s, 5-10 s, or greater than 10 s.

Additionally, the heating and cooling are preferably performed to facilitate or provide uniform or substantially or uniform temperature profiles axially and circumferentially in the tube. Such uniform heating and cooling provides a spatially uniform temperature history which facilitates uniform mechanical properties. Such uniform heating also provides for uniform deformation, also facilitating spatially uniform mechanical properties.

As indicated above, the tube may be elongated by a tensile force. The tensile force may be constant or variable with time. In an embodiment, the tensile force may be constant or the tensile force can be adjusted to provide a constant strain rate. The tube may be heated to the deformation temperature prior to applying a tension that elongates the tube. Additionally, the tube may be elongated prior to deformation, during deformation, after deformation, or a combination thereof.

In further embodiments, the tube can be annealed prior to deformation to increase the nucleation density prior to expansion to decrease the crystal size in the final product. In such an annealing process, the tube can be heated to a temperature that allows the formation of nuclei, but allows no or substantially no crystal growth. The temperature of annealing can be between a temperature of $Tg$ and $Tg+20°$ C. After the annealing step, the tube can be deformed or heated further to a deformation temperature and then deformed.

Several heating methods include applying or directing heat to the mold to heat the tube. In such embodiments, a mold can be made from a material with a high thermal conductivity which facilitates uniform heating in the axial and circumferential directions as well as allowing for rapid heating and cooling of the tube. In general, the mold may be made of a material having a thermal conductivity greater than 50 W/m K. In particular, the mold may be made of a metal or partially of a metal. For example, the mold may be made of aluminum, stainless steel, brass, or a Be—Cu alloy. In additional embodiments, the mold may be made of a porous material to reduce or prevent gas entrapment between the inner surface of the mold and outer surface of an expanded tube, thereby improving dimensional control. For example, the mold inner surface may have micron-size pores (e.g., 1-100 microns) through which gas can escape.

As discussed above, there are several mechanisms and methods of heating the tube during the blow molding process described above. Exemplary heating methods include radiant, heated gas, resistive, thermoelectric, or conductive.

As discussed above, the tube may also be heated by directing a heated gas onto the mold. For example, an elongated nozzle or a series of nozzles can be positioned along the tube axis at one or more circumferential positions. The nozzle or nozzles direct heated gas onto the mold which heats the tube. Due to the high thermal conductivity of the mold and the flow of the gas around the tube, the directed gas can heat the mold, and thus, the tube relatively uniformly axially and circumferentially. Alternatively, a nozzle directs heated gas at only a portion of an axial section of the tube can rapidly translate axially along the tube to heat the tube uniformly along its length.

Additionally, or alternatively to other heating methods, the compressed gas directed into the tube for expansion may also be at a temperature of Tambient. The gas may include air, nitrogen, argon, or other inert gases. In particular, compressed helium may be used. Helium has a thermal conductivity at 25° C. that is almost 6 times that of air or nitrogen and almost 9 times that of argon. The higher thermal conductivity may result in faster and more uniform heating of the tube.

Radiant heating can include, for example, infrared heating. To obtain uniform heating of the tube, several infrared sources or an elongated infrared source may be positioned along the mold axis at one or more circumferential positions Infrared heating can be adjusted so only the extruded tube is heated while the mold, if made of glass, is kept cold. That way expansion can occur against a cold mold, where cold may refer to a temperature near or at Tambient or below Tambient.

An electrical resistance heater may be positioned on, within, or adjacent to the mold to heat the tube. Alternatively, electrical resistive heating elements can be embedded in the mold. For example, electrical resistive heating elements can be distributed around and along the mold to provide uniform heating of the mold and tube.

Thermoelectric, in particular Peltier devices, may be used to heat the mold and balloon. Peltier devices refer to solid-state devices that function as heat pumps. A typical Peltier unit is a sandwich formed by two ceramic plates with an array of small Bismuth Telluride or other material cubes in between. When a DC current is applied, heat is moved from one side of the device to the other. The Peltier device can be positioned so that the heated side is adjacent to the mold. When current is reversed, the direction of heat transfer is reversed and the device acts a cooler to cool the mold after expansion. The heat can be removed by a heat sink.

Various methods may be used for cooling the mold and the deformed tube. A chilled fluid, such as water, may be circulated within or adjacent to the mold. For example, the mold can include channels or cavities through which the chilled fluid can circulate. The channels may be distributed around the circumference of the mold and along its length to provide uniform cooling.

Alternatively or additionally, a chilled gas may be used for cooling. Some embodiments can include directing a chilled gas onto the outside surface of the mold in the manner described for heating the mold with nozzles directing heated gas. A chilled gas may additionally or alternatively be directed into the expanded tube. The chilled gas may be at atmospheric pressure or compressed, for example, at a pressure between atmospheric and the deformation pressure.

Additionally, as discussed above, a heat sink can be used for cooling. The heat sink can be used in conjunction with a thermoelectric heater as described above. Alternatively, the heat sink can be positioned adjacent to the mold. The heater is placed between the heat sink and the mold. Materials that connect the mold to the heater and the heater to the heat sink in some embodiments are selected to increase resistance or decrease resistance of heat or cooling flow. An optimized combination of material selection can increase the speed and the accuracy of the active heating and active cooling that is desired to produce optimum material properties.

A split mold design may be used in some embodiments to further increase speed of heating and cooling and facilitate the ease of manufacturing. A split mold allows two heaters thus faster cooling and heating for half the mass of a given mold. Another advantage is it allows the tube to be loaded and unloaded quickly.

In other embodiments, a mold can be positioned between a heating medium and a cooling medium, for example, a heating plate and a cooling plate. The mold can be coupled to motion system that can translate the mold between the heating plate and the cooling plate. During heating, the mold can be positioned adjacent to or in contact with the heating plate. When heating is completed, the mold can be translated to adjacent to or in contact with the cooling plate to rapidly cool the mold.

In some embodiments, the inside surface of the mold can have a layer of a material reduce or eliminate sticking of the expanded tubing. For example, the inside surface can have layer of a non-stick polymer such as polytetrafluoroethylene or polytetrafluoroethene (PTFE) which is known by the brand name Teflon®.

Figure 4A:
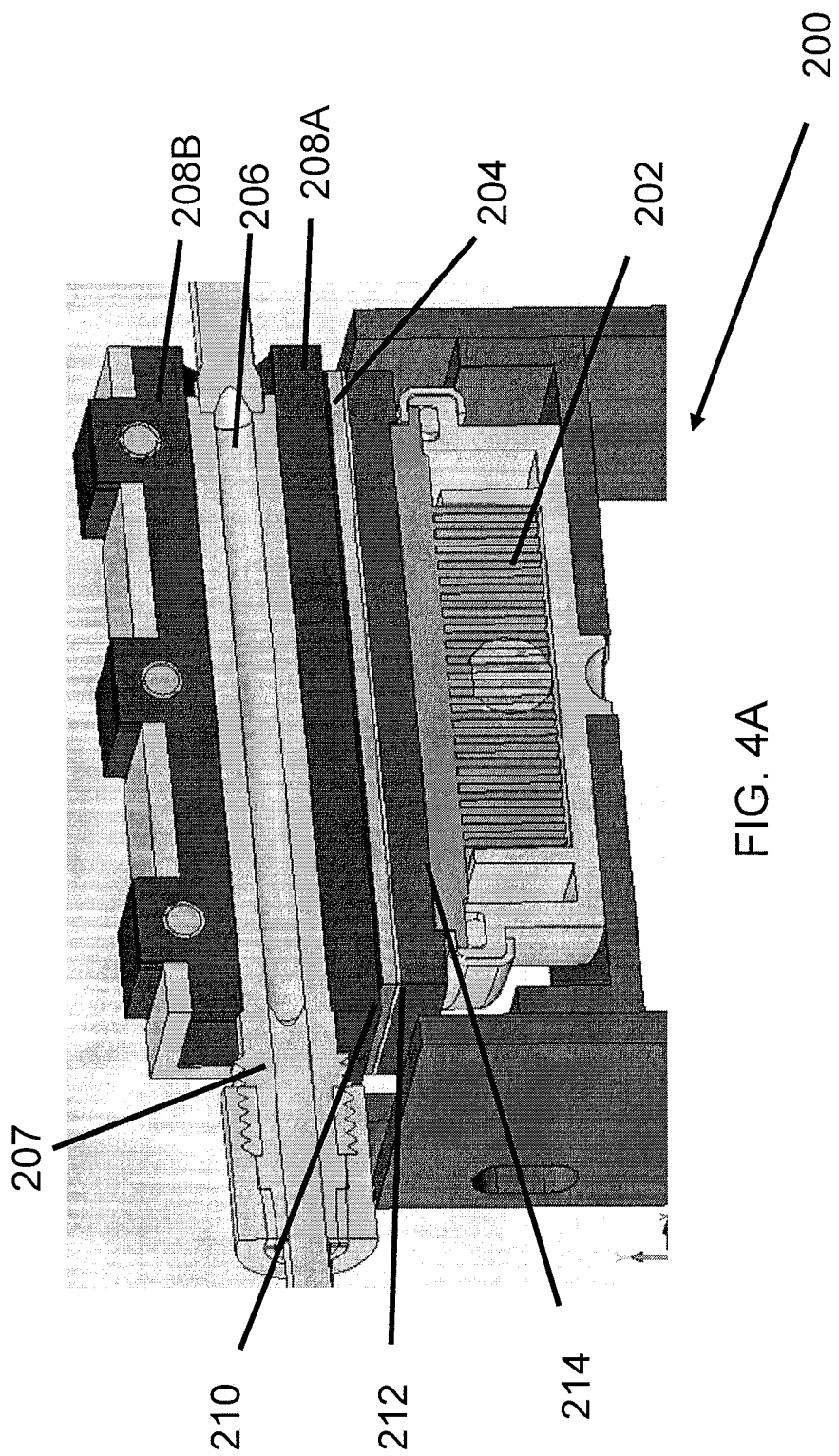
FIG. 4A depicts a cut-out profile of an exemplary assembly for blow molding a tube according to the present invention.

FIG. 4A depicts a cut-out profile of an exemplary assembly 200 for blow molding a tube according to the present invention. Assembly 200 has a mold body 207 in to which tube (not shown) can be disposed along it longitudinal axis. Mold body 207 is held between a lower mold housing 208A and an upper mold housing 208B. Mold body 207 is removable from the upper and lower mold housing. Mold body 207 has a cylindrical mold cavity 206 with tapered ends. A tube that extends along the axis of mold cavity 206 initially has a diameter less than mold cavity 206. During the blow molding process, the tube expands to the diameter of mold cavity 206 so that the outside surface of the tube is against the inside surface of mold cavity 206. A sheet heater 204 is disposed below lower mold housing 208A. Sheet heater 204 is below the whole length of mold cavity 206 to uniformly heat a whole length of an axial section of tube disposed in mold cavity 206. A low resistance gap pad is positioned between lower mold housing 208A and sheet heater 204. A heat sink 202, which may be water-cooled, is positioned below sheet heater 204. A high resistance gap pad 212 and a conductive epoxy bond 214 are positioned between sheet heater 204 and heat sink 202.

In some embodiments, active cooling of the heat sink with a chilled fluid corresponds to increasing and decreasing cooling water to the heat sink at the appropriate time to enhance the heating and cooling speed. For instance, a decrease cooling water flow during heat up and increase in cooling water flow during cool down. The greater the difference in temperature, the faster the rates.

Figure 4B:
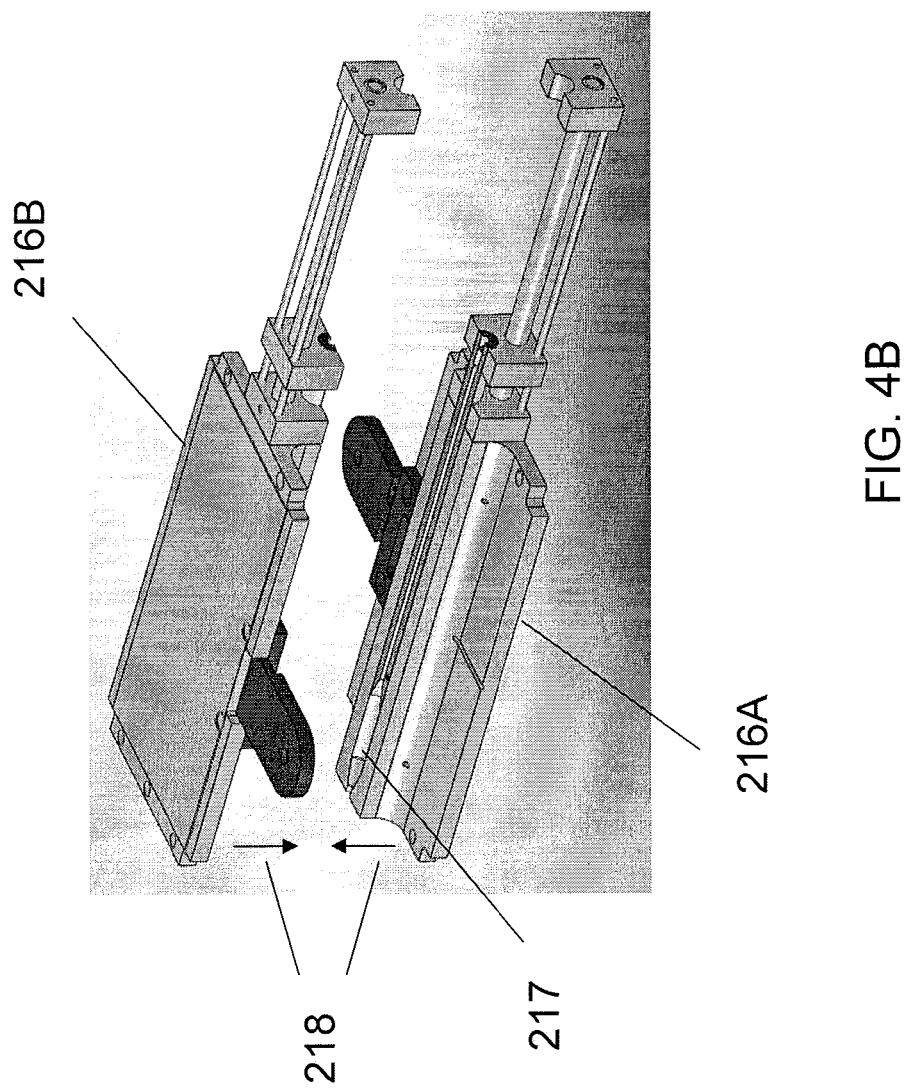
FIG. 4B depicts an exemplary split mold design for expanding a polymeric tube.

FIG. 4B depicts an exemplary split mold design for expanding a polymeric tube which shows a half mold member 216A and half mold member 216B. Half mold member 216A has a half-cylindrical shaped cavity 217 and half mold member 216B has a corresponding cavity (not shown). When half mold members 216A and 216B are positioned together as shown by arrows 218, the cavities form a mold into which a tube expands during blow molding.

Sheet heater 204 can be a ceramic heater, such as an aluminum nitride (ALN) heater, which can be obtained from Delta Design of Poway, Calif. FIG. 5A depicts the components of an aluminum nitride heater which includes layers of ALN sheets 220, RTD trace sheets 222, and heater trace sheets 224. An aluminum nitride heater 226, shown in FIG. 5C, is attached to heat sink block 228, as shown in FIG. 5C. Heat sink block 228 is always cold, while the aluminum nitride heater faces and heats the mold, as shown in FIG. 4A. As soon as the heater is turned off, cooling occurs very efficiently since the heater has little thermal mass.

Figure 6:
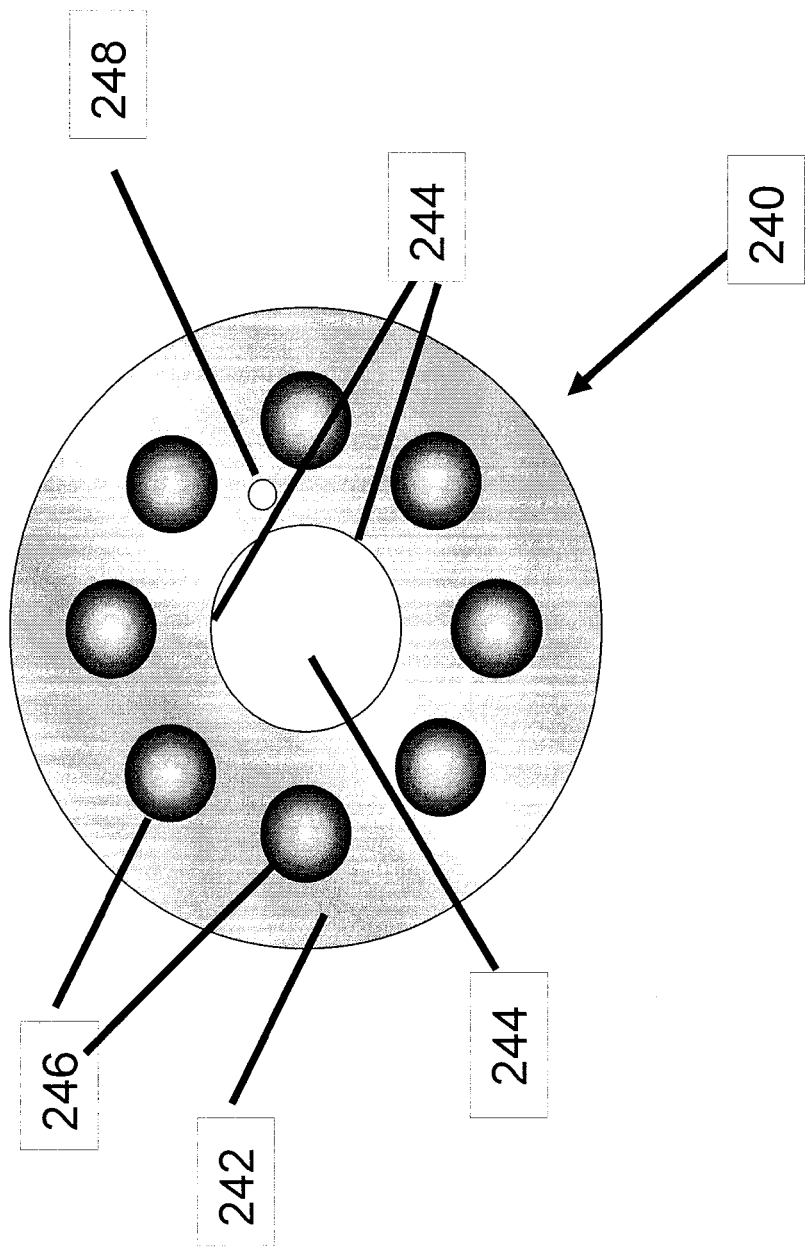
FIG. 6 depicts a radial profile of an exemplary mold with cylindrical heater elements embedded in a mold body.

FIG. 6 depicts a radial profile of an exemplary mold 240 for blow molding a tube according to the present invention. Mold 240 has a mold body 242 with a tubular mold cavity 244 within which a tube (not shown) is expanded against inner wall 245 of mold body 242. Elongated heaters 246 are embedded in mold body 242 for heating the mold and tube positioned within mold cavity 244. Heaters 246 may be tubular resistive cartridge heating elements that are inserted holes drilled into mold cavity 244. Heaters 246 are distributed radially within the wall of mold body 242 and extend along the axis of mold body 242 at least along the length including mold cavity 244. Additionally, mold body 242 includes a thermocouple 248 for monitoring the temperature of the mold during the blow molding process. Thermocouple 248 can extend along partially or completely along the axis of mold body 242 so that it can monitor the temperature along part of or the entire mold body 242 adjacent to mold cavity 244.

The degree of radial deformation may be quantified by percent radial expansion:

$$\left[\frac{\text{Outside Diameter of Deformed Tube}}{\text{Original outside Diameter of Tube}} - 1\right] \times 100\%$$

In some embodiments, percent radial expansion can be 200-500%. In an exemplary embodiment, the percent radial expansion is about 300%. Similarly, the degree of axial deformation may be quantified by the percent axial elongation:

$$\left[\frac{\text{Length of Deformed Tube}}{\text{Original Length of Tube}} - 1\right] \times 100\%$$

The percent axial elongation can be, for example, 0-200%.

Axial polymer orientation is also imparted to a tube during formation of the tube as the polymer is drawn out of a die during the extrusion process. The degree of axial orientation of polymer provided by the draw down process is related the axial drawn down ratio:

$$\frac{\text{Inside Diameter of Die}}{\text{Original Inside Diameter of Tube}}.$$

In an exemplary embodiment the axial drawn down ratio is 2:1 to 6:1.

For the purposes of the present invention, the following terms and definitions apply:

"Ambient temperature" can be any temperature including and between 20° C. and 30° C.

The "glass transition temperature," Tg, is the temperature at which the amorphous domains of a polymer change from a brittle vitreous state to a solid deformable or ductile state at atmospheric pressure. In other words, the Tg corresponds to the temperature where the onset of segmental motion in the chains of the polymer occurs. When an amorphous or semi-crystalline polymer is exposed to an increasing temperature, the coefficient of expansion and the heat capacity of the polymer both increase as the temperature is raised, indicating increased molecular motion. As the temperature is raised the actual molecular volume in the sample remains constant, and so a higher coefficient of expansion points to an increase in free volume associated with the system and therefore increased freedom for the molecules to move. The increasing heat capacity corresponds to an increase in heat dissipation through movement. Tg of a given polymer can be dependent on the heating rate and can be influenced by the thermal history of the polymer. Furthermore, the chemical structure of the polymer heavily influences the glass transition by affecting mobility.

"Stress" refers to force per unit area, as in the force acting through a small area within a plane. Stress can be divided into components, normal and parallel to the plane, called normal stress and shear stress, respectively. Tensile stress, for example, is a normal component of stress applied that leads to expansion (increase in length). In addition, compressive stress is a normal component of stress applied to materials resulting in their compaction (decrease in length). Stress may result in deformation of a material, which refers to a change in length. "Expansion" or "compression" may be defined as the increase or decrease in length of a sample of material when the sample is subjected to stress.

"Strain" refers to the amount of expansion or compression that occurs in a material at a given stress or load. Strain may be expressed as a fraction or percentage of the original length, i.e., the change in length divided by the original length. Strain, therefore, is positive for expansion and negative for compression.

"Strength" refers to the maximum stress along an axis which a material will withstand prior to fracture. The ultimate strength is calculated from the maximum load applied during the test divided by the original cross-sectional area.

"Modulus" may be defined as the ratio of a component of stress or force per unit area applied to a material divided by the strain along an axis of applied force that results from the applied force. For example, a material has both a tensile and a compressive modulus.

The tensile stress on a material may be increased until it reaches a "tensile strength" which refers to the maximum tensile stress which a material will withstand prior to fracture. The ultimate tensile strength is calculated from the maximum load applied during a test divided by the original cross-sectional area. Similarly, "compressive strength" is the capacity of a material to withstand axially directed pushing forces. When the limit of compressive strength is reached, a material is crushed.

"Toughness" is the amount of energy absorbed prior to fracture, or equivalently, the amount of work required to fracture a material. One measure of toughness is the area under a stress-strain curve from zero strain to the strain at fracture. The units of toughness in this case are in energy per unit volume of material. See, e.g., L. H. Van Vlack, "Elements of Materials Science and Engineering," pp. 270-271, Addison-Wesley (Reading, Pa., 1989).

The underlying structure or substrate of an implantable medical device, such as a stent can be completely or at least in part made from a biodegradable polymer or combination of biodegradable polymers, a biostable polymer or combination of biostable polymers, or a combination of biodegradable and biostable polymers. Additionally, a polymer-based coating for a surface of a device can be a biodegradable polymer or combination of biodegradable polymers, a biostable polymer or combination of biostable polymers, or a combination of biodegradable and biostable polymers.

It is understood that after the process of degradation, erosion, absorption, and/or resorption has been completed, no part of the stent will remain or in the case of coating applications on a biostable scaffolding, no polymer will remain on the device. In some embodiments, very negligible traces or residue may be left behind. For stents made from a biodegradable polymer, the stent is intended to remain in the body for a duration of time until its intended function of, for example, maintaining vascular patency and/or drug delivery is accomplished.

Representative examples of polymers that may be used to fabricate an implantable medical device include, but are not limited to, poly(N-acetylglucosamine) (Chitin), Chitosan, poly(hydroxyvalerate), poly(lactide-co-glycolide), poly(hydroxybutyrate), poly(hydroxybutyrate-co-valerate), poly-orthoester, polyanhydride, poly(glycolic acid), poly(glycolide), poly(L-lactic acid), poly(L-lactide), poly(D,L-lactic acid), poly(D,L-lactide), poly(caprolactone), poly(trimethylene carbonate), polyester amide, poly(glycolic acid-co-trimethylene carbonate), co-poly(ether-esters) (e.g. PEO/PLA), polyphosphazenes, biomolecules (such as fibrin, fibrinogen, cellulose, starch, collagen and hyaluronic acid), polyurethanes, silicones, polyesters, polyolefins, polyisobutylene and ethylene-alphaolefin copolymers, acrylic polymers and copolymers other than polyacrylates, vinyl halide polymers and copolymers (such as polyvinyl chloride), polyvinyl ethers (such as polyvinyl methyl ether), polyvinylidene halides (such as polyvinylidene chloride), polyacrylonitrile, polyvinyl ketones, polyvinyl aromatics (such as polystyrene), polyvinyl esters (such as polyvinyl acetate), acrylonitrile-styrene copolymers, ABS resins, polyamides (such as Nylon 66 and polycaprolactam), polycarbonates, polyoxymethylenes, polyimides, polyethers, polyurethanes, rayon, rayon-triacetate, cellulose, cellulose acetate, cellulose butyrate, cellulose acetate butyrate, cellophane, cellulose nitrate, cellulose propionate, cellulose ethers, and carboxymethyl cellulose. Another type of polymer based on poly(lactic acid) that can be used includes graft copolymers, and block copolymers, such as AB block-copolymers ("diblock-copolymers") or ABA block-copolymers ("triblock-copolymers"), or mixtures thereof.

Additional representative examples of polymers that may be especially well suited for use in fabricating or coating an implantable medical device include ethylene vinyl alcohol copolymer (commonly known by the generic name EVOH or by the trade name EVAL), poly(butyl methacrylate), poly (vinylidene fluoride-co-hexafluororpropene) (e.g., SOLEF 21508, available from Solvay Solexis PVDF, Thorofare, N.J.), polyvinylidene fluoride (otherwise known as KYNAR, available from ATOFINA Chemicals, Philadelphia, Pa.), ethylene-vinyl acetate copolymers, and polyethylene glycol.

EXAMPLES

PLLA polymeric tubes were radially expanded by a method of the present invention. The tubes were extruded PLLA tubes with an inside diameter (ID) of 0.060 inches and an outside diameter (OD) of 0.084 inches. The tubes were disposed in a metallic mold having an inside diameter of 0.136 inches. The mold was heated by a nozzle that blew hot air along the entire length of the mold so that a tube in the mold expanded along the entire length of the mold at the same time. The pressure inside the tube was increased by blowing room temperature air into the tube.

Tubes were expanded using 21 different processing conditions which are listed in Table 1. At least 5 expanded tubes were generated for each processing condition. The air temperature from the heated nozzle is shown in the second column of Table 1 in degrees Fahrenheit. After the tube is expanded, the tube is cooled by a nozzle blowing cooled air on the outside surface of the mold. The air flow rate directed into the tube is also given in column 2 of Table 1 in scfh (cubic feet per hour of gas flow at standard conditions of temperature and pressure, i.e., 0° C. and 100 kPa). The cooling delay, cooling time, and the process time in seconds are given in column 3. The cooling delay is the time delay between the deformation or expansion of the tube against the inner surface of the mold and the start of cooling. The start of cooling corresponds to the start of the blowing of the cooled air on the mold. The cooling time is the length of time the cooled air is blowing on the mold. The process time is the total process time which includes the heating time, cooling delay, and the cooling time. The cooling time does not necessarily correspond to the time the tube takes to go from the expansion temperature to the Tg of the polymer tube. It is expected that the tube reaches the Tg of the polymer at a time much less than the cooling time, e.g., in less than 50% or 25% of the cooling time.

TABLE 1

Process conditions for expanson of PLLA tubes. Air flow rate was 90 scfh for each set of conditions.

| Process Condition Identifier | Air temperature (degrees F. and C.) | | Cooling delay/cooling time/process time | Expansion Pressure (psi) |
|---|---|---|---|---|
| 1 | 175 | 65.2 | 2s/15s, 56s | 244 |
| 2 | 175 | 65.2 | 2s/15s, 46s | 256 |
| 3 | 175 | 65.2 | 2s/14s, 52s | 244 |

TABLE 1-continued

Process conditions for expanson of PLLA tubes. Air flow rate was 90 scfh for each set of conditions.

| Process Condition Identifier | Air temperature (degrees F. and C.) | | Cooling delay/cooling time/process time | Expansion Pressure (psi) |
|---|---|---|---|---|
| 4  | 175 | 65.2 | 1s/14s, 52s  | 244 |
| 5  | 175 | 65.2 | 5s/15s, 47s  | 244 |
| 6  | 165 | 59.7 | 1s/10s, 57s  | 256 |
| 7  | 222 | 91.3 | 10s/15s, 30s | 256 |
| 8  | 205 | 81.9 | 10s/15s, 42s | 256 |
| 9  | 200 | 79.1 | 3s/10s, 50s  | 276 |
| 10 | 200 | 79.1 | 8s/12s, 38s  | 256 |
| 11 | 195 | 76.3 | 10s/12s, 46s | 256 |
| 12 | 170 | 62.4 | 1s/10s, 65s  | 246 |
| 13 | 170 | 62.4 | 1s/10s, 61s  | 246 |
| 14 | 170 | 62.4 | 1s/10s, 61s  | 246 |
| 15 | 200 | 79.1 | 6s/15s, 46s  | 256 |
| 16 | 190 | 73.6 | 3s/12s, 45s  | 256 |
| 17 | 190 | 73.6 | 3s/12s, 50s  | 256 |
| 18 | 180 | 68.0 | 2s/12s, 50s  | 256 |
| 19 | 175 | 65.2 | 2s/12s, 60s  | 256 |
| 20 | 180 | 68.0 | 3s/12s, 56s  | 256 |

Figure 7:
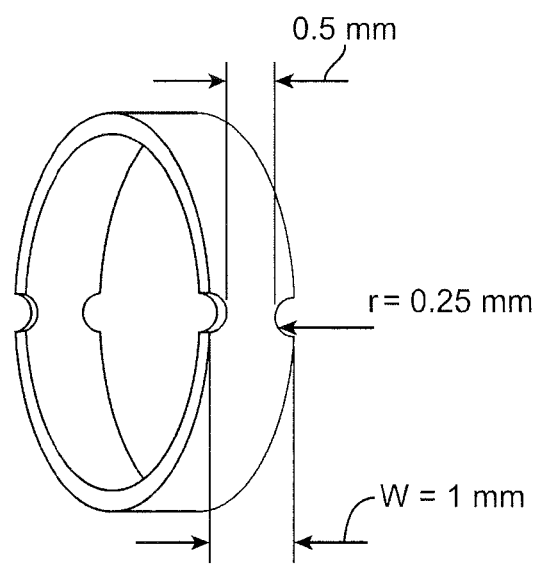
FIG. 7 depicts an ribbon with four notches for hoop strength testing, which was cut from a blow molded tube that was expanded within a mold according to blow molding process of the present invention.

The mechanical properties of the expanded tubes were measured using a modified ASTM test with an Instron testing machine. The test specimen was a ring or ribbon with four notches for hoop strength testing, which was cut from a blow molded tube that was expanded within a mold according to blow molding process of the present invention. The testing specimen, illustrated in FIG. 7, had a 1 mm width, two two-sided notches, and a 0.5 mm minimum area or distance between notches. The tests were used to determine the ultimate apparent hoop strength, the stiffness or modulus in radial direction, and maximum elongation in the radial direction. The maximum elongation is a measure of the fracture toughness of the samples.

The test method is a standard test method for apparent hoop tensile strength for plastic or reinforced plastic pipe by a split disk method. Two mandrels, one fixed and one movable, were inserted through a test specimen with the axis of the mandrel parallel to the axis of the test specimen. During a test, the movable mandrel was moved at a constant speed perpendicular to the axis of the mandrel which caused the test specimen to deform. The mandrel was moved until one side of the test specimen failed. The strain rate or the rate of movement of the movable mandrel is 0.2 in/min.

Figure 8:
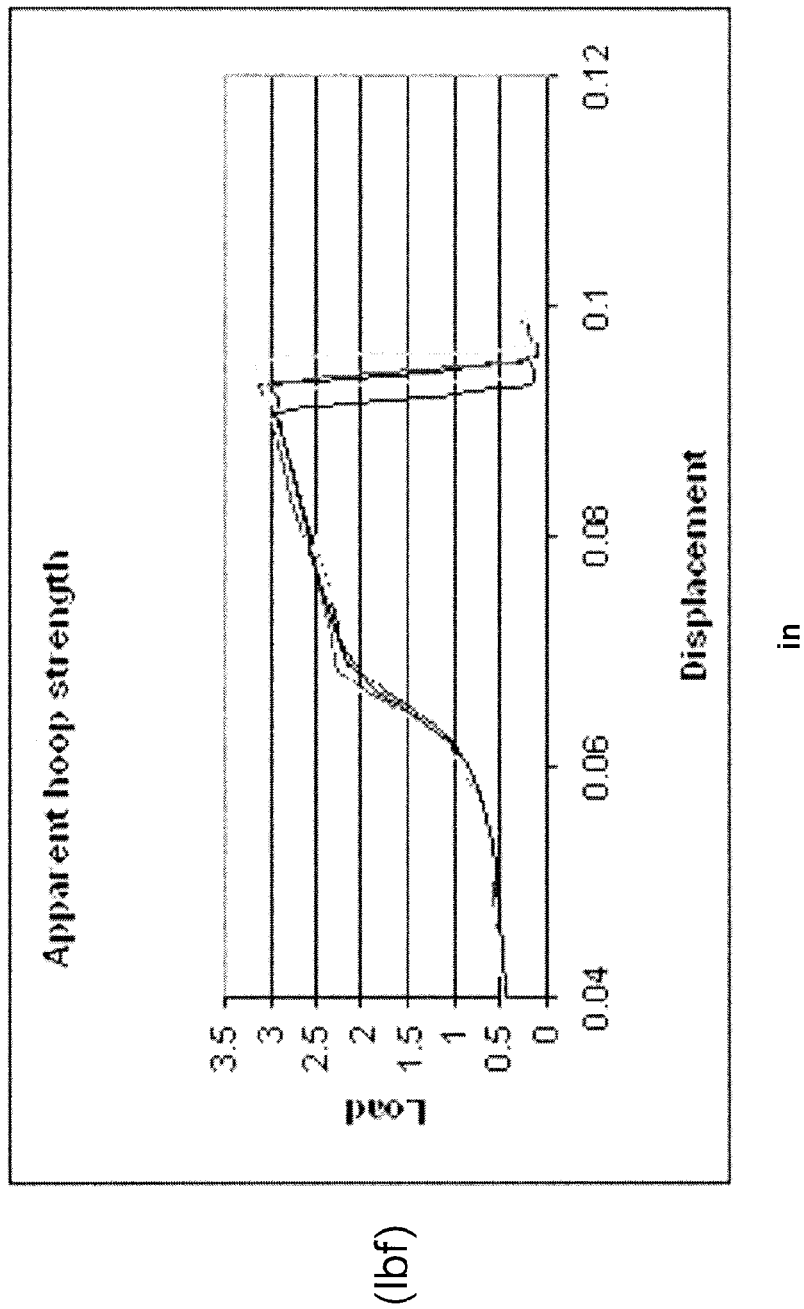
FIG. 8 depicts the load-displacement curves of hoop strength testing for ribbons shown in FIG. 7.

FIG. 8 shows exemplary force vs. displacement curves from tensile testing as described above for tubes expanded with process condition No. 3. The load is in units of $lb_f$ and the displacement in units of inches. The relatively linear portion of the curve between a displacement of about 0.7 and 0.95 represents yield or necking in the sample, which is indicative of ductile behavior. The apparent hoop tensile strength=13273 psi and hoop yield strength=9792.4 psi. The radial elongation is 0.0234 in.

The crystallinity and Tg of the samples was determined from differential scanning calorimetry. For the samples expanded with condition no. 3, the crystallinity was 19.3% and the Tg=55.87° C.

Figure 9:
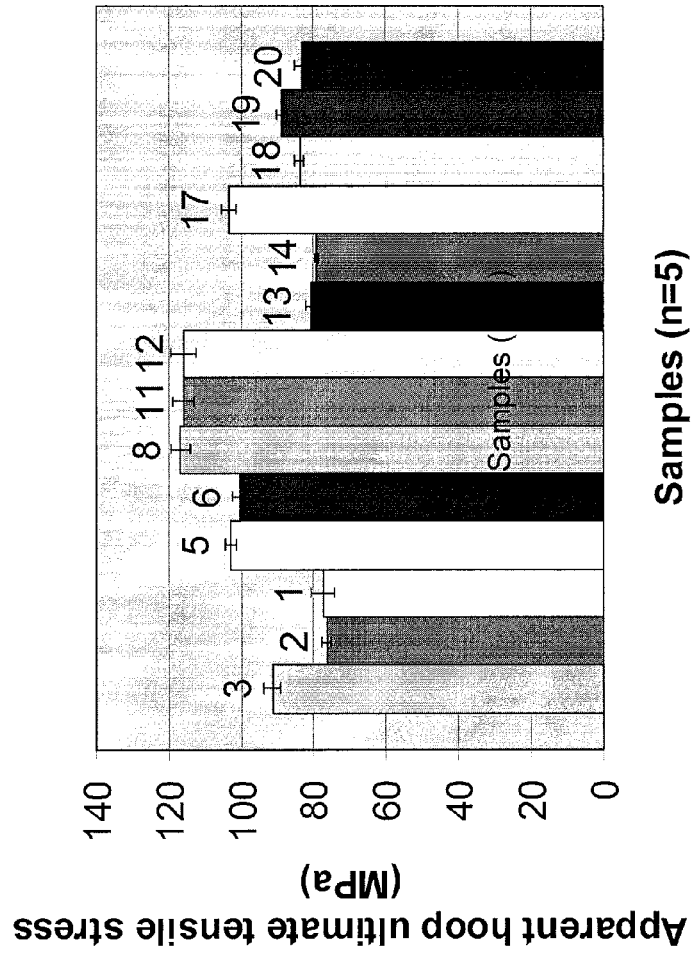
FIG. 9 depicts a chart showing the measured apparent hoop ultimate tensile strength of test specimens from PLLA tubes expanded using various process conditions.
Figure 10:
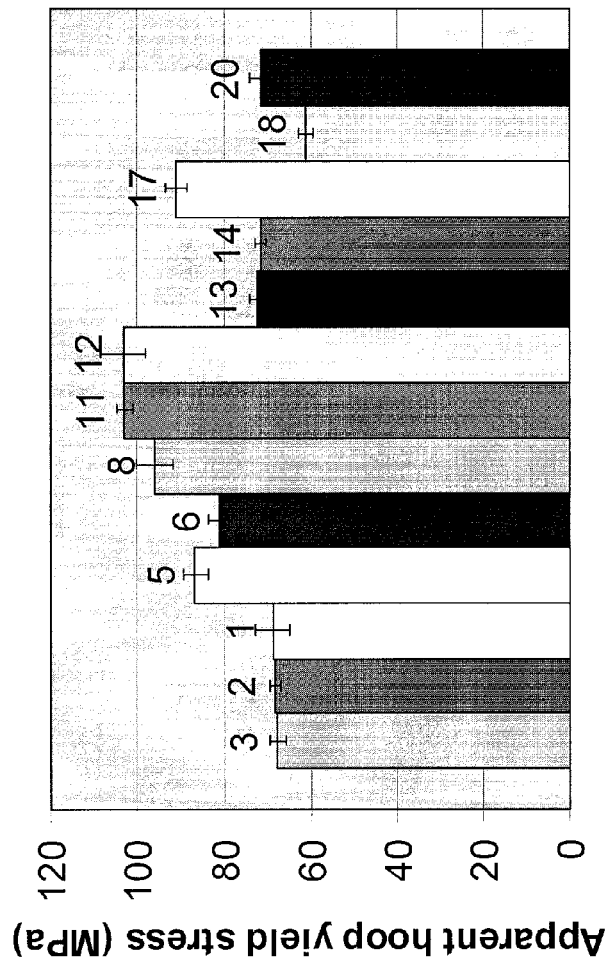
FIG. 10 depicts a chart showing the measured apparent hoop yield stress of the test specimens of FIG. 9.
Figure 11:
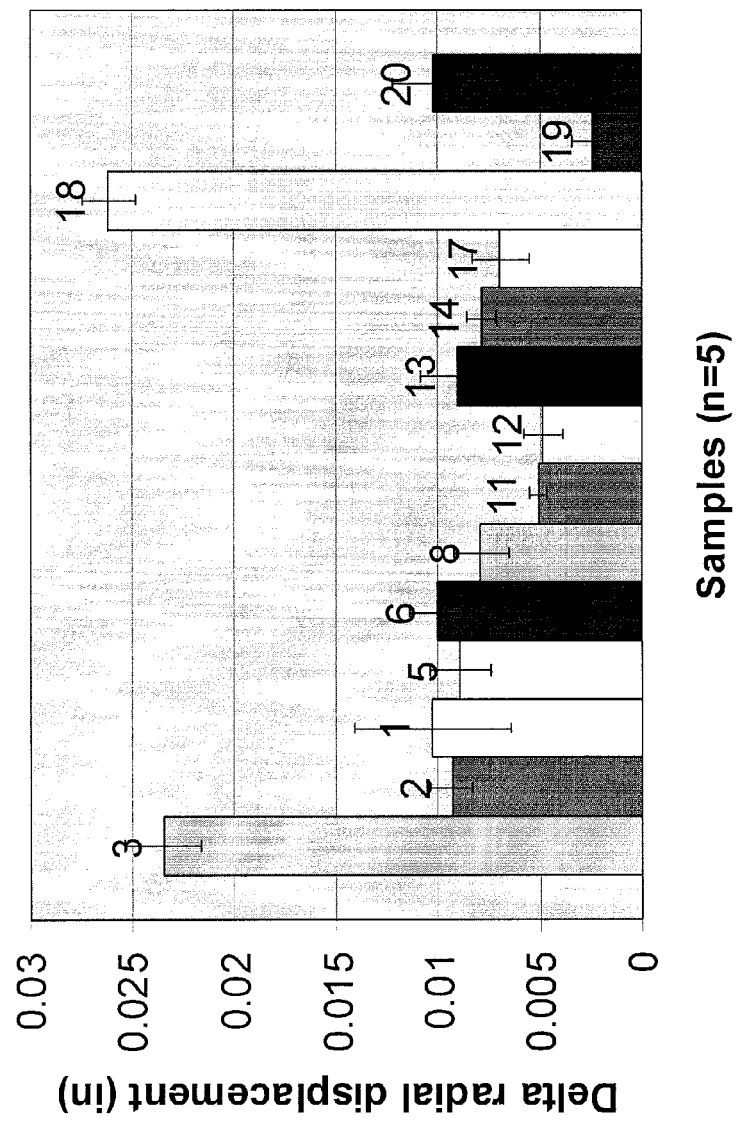
FIG. 11 depicts a chart showing the measured maximum radial elongation of the test specimens of FIG. 9.

FIG. 9 depicts a chart showing the measured apparent hoop ultimate tensile strength of test specimens, as described above, from PLLA tubes expanded using process conditions in Table 1. FIG. 10 depicts a chart showing the measured apparent hoop yield stress of the test specimens. FIG. 11 depicts a chart showing the measured maximum radial elongation of the test specimens.

Figure 12:
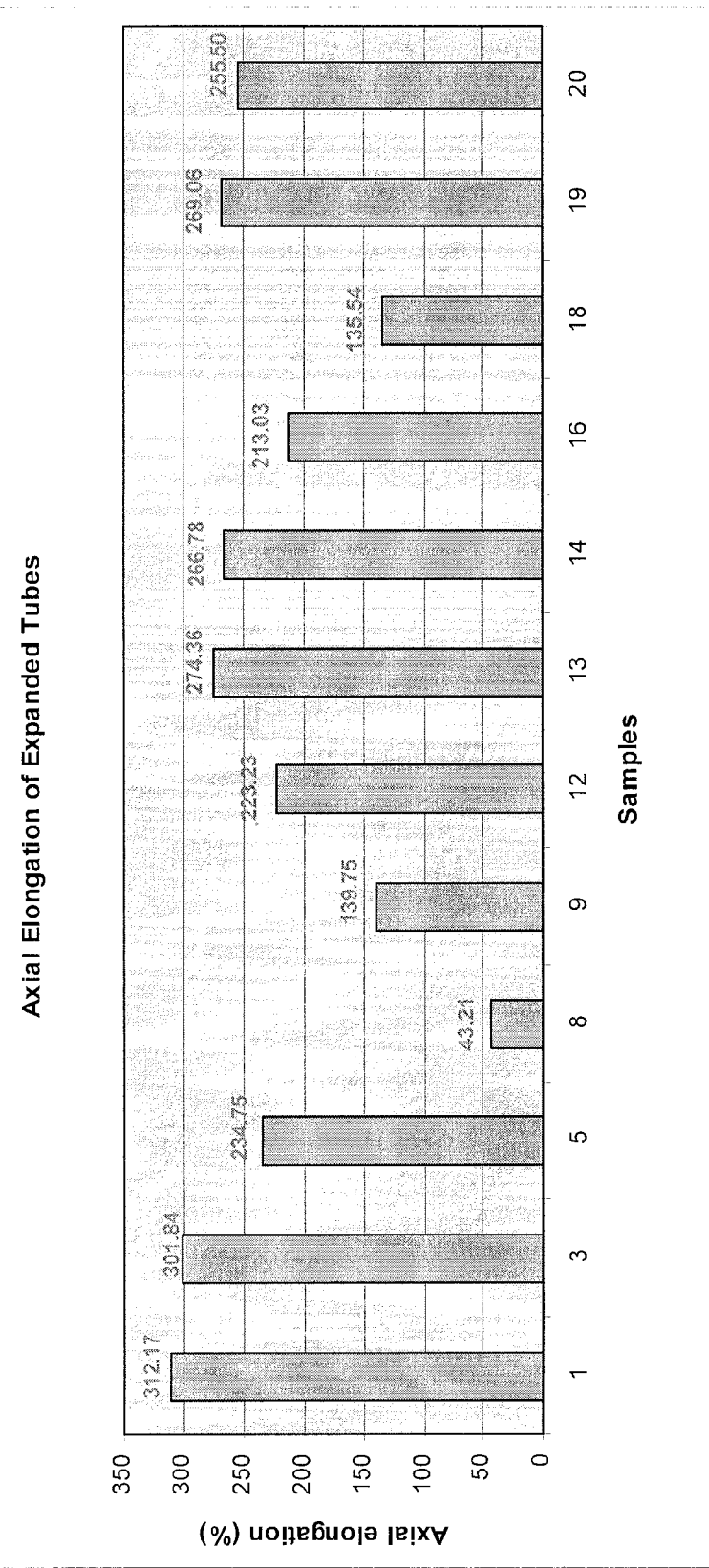
FIG. 12 depicts the axial elongation at break for the tube samples of FIG. 9.

The PLLA expanded tube samples were also subjected to axial elongation tests. In these tests the expanded tubes were stretched along the axial direction. The strain rate along the axial direction was 1 in/min. FIG. 12 depicts the axial elongation at break for tube samples at several processing conditions from Table 1.

Figure 13:
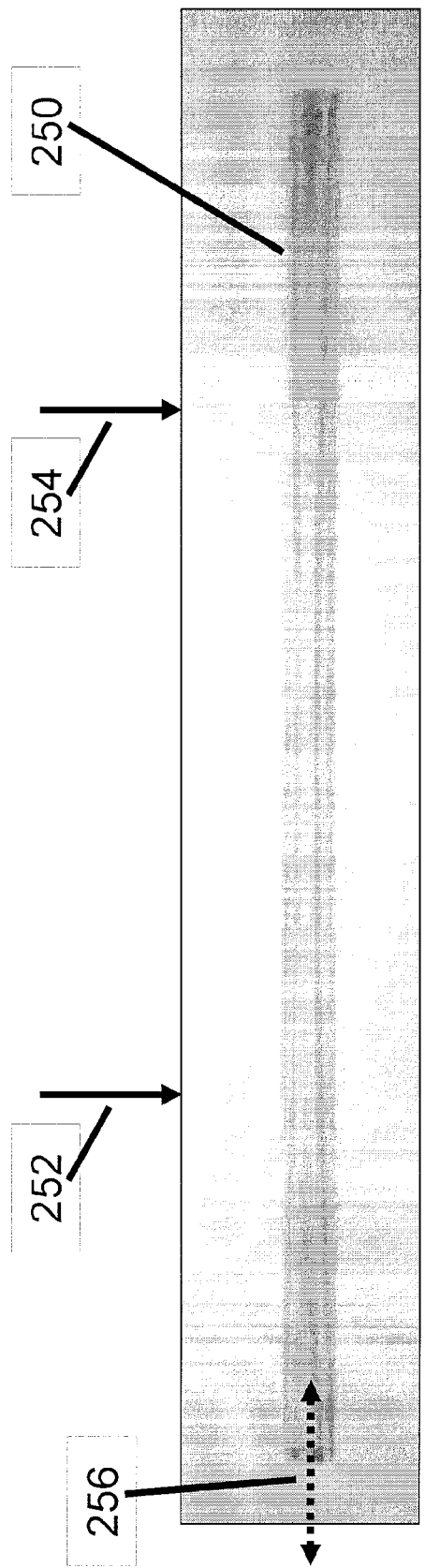
FIG. 13 depicts optical micrograph of a blow molded tube 250 that was expanded within a mold according to a blow molding process of the present invention.

FIG. 13 depicts optical micrograph of a blow molded tube 250 that was expanded within a mold according to a blow molding process of the present invention. The optical micrograph is a image of the tube exposed to polarized light. The substantial homogeneity of the pattern along the axis 256, particularly between arrows 252 and 254, illustrate the uniformity of structure and stress distribution along the axis resulting from the uniform expansion along the tube.

Figure 14A:
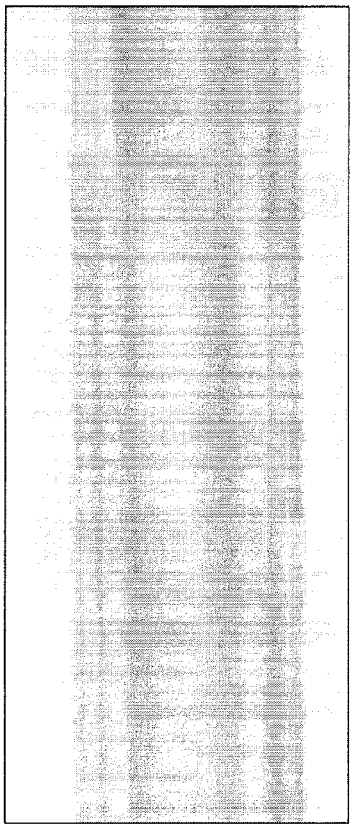
FIG. 14A depicts a close-up view of the optical micrograph of FIG. 13.
Figure 14B:
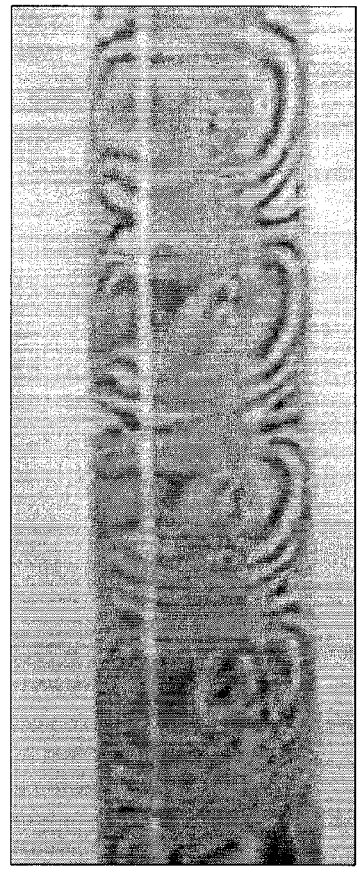
FIG. 14B depicts an optical micrograph of a blow molded tube expanded by a method in which the entire tube is not expanded at the same time along its length.

FIG. 14A depicts a close-up view of the optical micrograph of FIG. 13, further illustrating the uniformity of structure and stress. FIG. 14B depicts an optical micrograph of a blow molded tube expanded by a method in which the entire tube is not expanded at the same time along its length. The tube expands as a nozzle directing warm gas on the tube translates along the length of the tube. The optical micrograph in FIG. 14B has irregular sets of patterns that illustrate structural heterogeneity and a heterogeneous stress distribution.

Figure 15A:
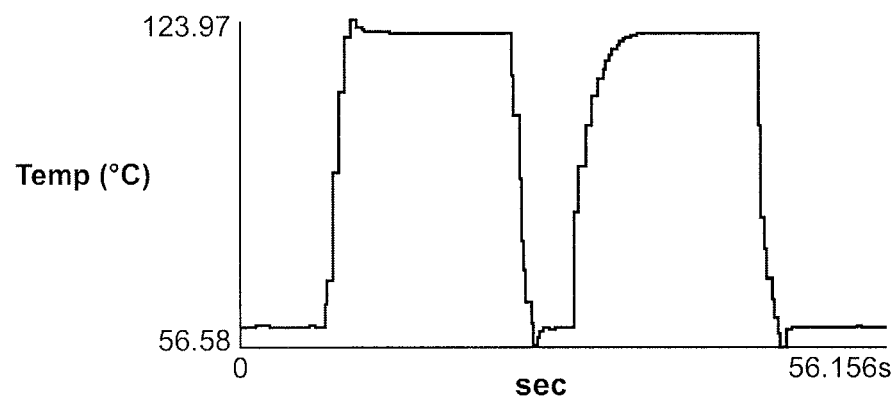
FIGS. 15A-C illustrates heating of a heat sink with heating fluid and active and passive cooling of the heat sink.
Figure 15B:
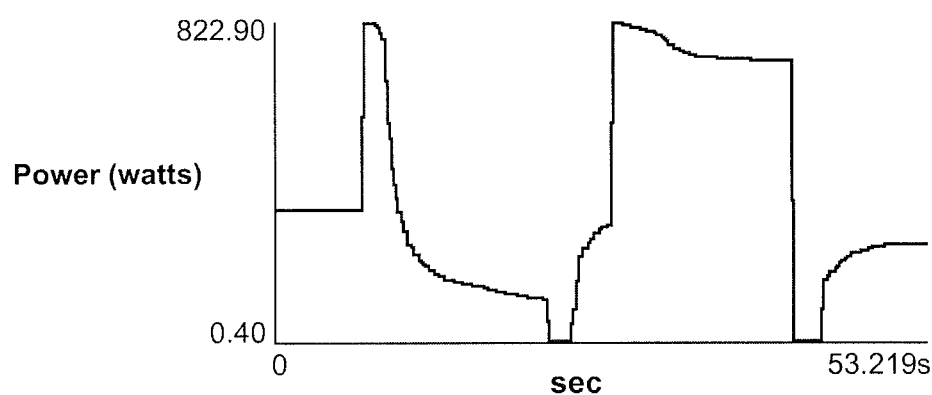
Figure 15C:
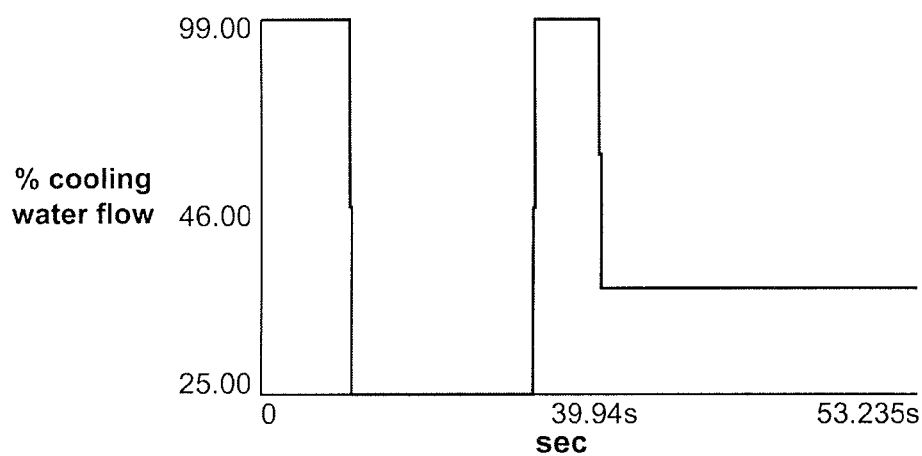

FIGS. 15A-C illustrates heating of a heat sink with heating fluid and active and passive cooling of the heat sink. Active cooling corresponds to cooling the heat sink with a cooling fluid flow. Passive cooling corresponds to no cooling fluid to the heat sink. The top graph is the temperature (° C.) vs. time (sec) of the heat sink, the middle is power input (watts) vs. time (sec) to the heat sink, and the bottom graph is percent cooling water flow vs. time (sec) to the heat sink. There are two wave forms in each graph. The wave form on the left corresponds to active cooling and the wave form on the right corresponds to passive cooling.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A method of making a stent comprising:
   disposing a polymer tube within a cylindrical mold having a larger diameter than the tube, wherein the polymer tube is made completely of a bioresorbable polymer;
   heating the tube with infrared radiation from an infrared radiation source, wherein the heated tube radially expands against an inner surface of the mold; and
   making a stent from the radially expanded tube.

2. The method of claim 1, wherein a second radiation source is positioned at a circumferential position of the mold different from the radiation source and radiation from the second radiation source heats the tube.

3. The method of claim 1, wherein the bioresorbable polymer is semi-crystalline.

4. The method of claim 1, wherein the tube is heated to a temperature between a glass transition temperature and melting temperature of the polymer of the polymer tube.

5. The method of claim 1, further comprising increasing a pressure inside the tube, wherein the polymer tube radially expands due to an increase in pressure and increase in temperature of the polymer tube from the heating.

6. The method of claim 1, wherein the infrared radiation source is positioned along the mold axis.

* * * * *

UNITED STATES PATENT AND TRADEMARK OFFICE
CERTIFICATE OF CORRECTION

| | | |
|---|---|---|
| PATENT NO. | : 9,278,477 B2 | Page 1 of 1 |
| APPLICATION NO. | : 14/480484 | |
| DATED | : March 8, 2016 | |
| INVENTOR(S) | : Kleiner et al. | |

It is certified that error appears in the above-identified patent and that said Letters Patent is hereby corrected as shown below:

On The Title Page, Item (60) Related U.S. Application Data
"Aug. 4, 2006" should read -- Aug. 4, 2008 --

Signed and Sealed this
Third Day of May, 2016

Michelle K. Lee
*Director of the United States Patent and Trademark Office*